(12) United States Patent
Shuf et al.

(10) Patent No.: US 7,930,294 B2
(45) Date of Patent: Apr. 19, 2011

(54) METHOD FOR PARTITIONING A QUERY

(75) Inventors: Yefim Shuf, Ossining, NY (US); Hong Min, Poughkeepsie, NY (US); Terence Patrick Purcell, Springfield, IL (US); Ou Jin, Morgan Hill, CA (US); Fen-Ling Lin, San Jose, CA (US); Brian Thinh-Vinh Tran, San Jose, CA (US); Patrick Dooling Bossman, Alexandria, VA (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 12/190,187

(22) Filed: Aug. 12, 2008

(65) Prior Publication Data
US 2010/0042631 A1 Feb. 18, 2010

(51) Int. Cl.
*G06F 17/30* (2006.01)
(52) U.S. Cl. .................................. 707/713; 707/755
(58) Field of Classification Search .............. 707/713, 707/714, 717, 718, 719, 736, 755, 759, 764, 707/765, 803
See application file for complete search history.

(56) References Cited

U.S. PATENT DOCUMENTS

| 7,302,425 | B1 | 11/2007 | Bernstein et al. |
| 2002/0161891 | A1 | 10/2002 | Higuchi et al. |
| 2004/0122845 | A1* | 6/2004 | Lohman et al. ............... 707/102 |
| 2005/0131893 | A1 | 6/2005 | Von Glan |
| 2006/0218123 | A1* | 9/2006 | Chowdhuri et al. ............... 707/2 |
| 2007/0027860 | A1* | 2/2007 | Bestgen et al. ................... 707/5 |
| 2008/0071755 | A1 | 3/2008 | Barsness et al. |
| 2008/0098045 | A1* | 4/2008 | Radhakrishnan et al. .... 707/203 |
| 2008/0104041 | A1 | 5/2008 | Bjornson et al. |

FOREIGN PATENT DOCUMENTS

| EP | 992909 | 4/2000 |
| EP | 1217541 | 6/2002 |
| WO | WO 2005/076160 | 8/2005 |

* cited by examiner

*Primary Examiner* — Cam-Linh Nguyen
(74) *Attorney, Agent, or Firm* — Ryan, Mason & Lewis, LLP

(57) ABSTRACT

Techniques for partitioning a query are provided. The techniques include establishing one or more criterion for partitioning a query, wherein the query comprises one or more tables, materializing a first of the one or more tables, partitioning the first of the one or more tables until the one or more criterion have been satisfied, and partitioning and joining a remainder of the one or more tables of the query.

22 Claims, 5 Drawing Sheets

T1: KEY=(1,2)-UNCERTAIN BEFORE EXECUTION
T2: KEY=(3,4)-UNCERTAIN BEFORE EXECUTION

METHOD FOR PARTITIONING A QUERY

FIELD OF THE INVENTION

The present invention generally relates to information technology, and, more particularly, to query partitioning.

BACKGROUND OF THE INVENTION

In a relational database management system (RDBMS), an intra-query partitioning is often used to reduce query processing time. Each partition (of the queried data) is processed by a worker thread and multiple worker threads process a query concurrently. Several partition attributes, such as the number of partitions and a key range or a page range of each partition, are determined by a query optimizer at a query compilation time. For multi-join queries, when several relations are joined by one or more types of join operators, the partition attributes are predetermined by the leading relations in the join sequence based on the available statistics and an estimated predicate filtering factor that the query optimizer relies on. In many cases, when a nested loop join (NLJ) operator is used, the leading relations in a query are the smaller ones, joined by larger relations and then further joined by larger or smaller relations.

Intra-query parallelism is used to break a query into sub-tasks and process them in parallel using different central processing units (CPUs) or input/output (I/O) threads to reduce query response time. Partitioning a multi-table join (multi-join) query can be performed on one or more tables that are involved in a pipelined process. For example, one existing approach includes partitioning on the first table's distinct keys or on physical locations on the disk. Deciding how, when and where to partition query operations can be made at query compilation and/or optimization time before query execution.

Based on previously gathered query object statistics, estimated filtering from query predicates and available system resources, decisions such as which tables are used for partitioning and how many partitions are generated, remain unchanged during the course of query execution. However, frequently, the partitioning decisions for multi-join queries are less optimal, which creates an impediment for obtaining good query performance. There exist problems in existing approaches such as, for example, unbalanced workloads for each sub-task, which can be caused by insufficient or infrequently refreshed database statistics (refreshing database statistics can be expensive).

Other disadvantages exist, such as, for example, a smaller number of partitioned working sets than the number of available tasks to fully utilize allocated system resources, which can be caused by insufficient database statistics, infrequently refreshed database statistics and imprecise filter factor estimation at compilation time.

In reality, the available statistics are often inaccurate due to frequent data updates or the lack of timely statistics gathering. In existing approaches, gathering very detailed and targeted statistics is either not supported by RDBMS or very expensive in a production environment even if it is supported. Without accurate and targeted statistics, the estimation of a predicate filtering factor and the estimation of subsequently qualified rows after each join step may not be accurate.

Such inaccuracy leads to two problems. One problem is that a partitioned working set is uneven in size if some partitions are relatively larger than others and, as a result, the larger partitions take a much longer time to process than the smaller partitions (that is, work imbalance and sub-optimal performance). A second problem is that the actual turnout of the leading relations may have only a small number of keys, pages or records that can be used for partitioning. Specifically, the number of partitions might be smaller than the number of available worker threads.

A finer grained partitioning in such a case cannot be created. Because the larger relations are joined later, the fan out working set, as a result, can be large and skewed. A few large partitions take a long time to be processed by a subset of the worker threads, with rest of the worker threads starving due to the lack of work.

For example, FIG. 1 depicts a sequence of multi-join query, where Ri (i=1 ... 6) can be a base relation or a relation derived from sub-query. In FIG. 1, R4 is much larger than all other relations, and R1 is used for intra-query parallelism partitioning. Due to inaccurate estimation on filtering, R1 only generates two records that are used for partitioning. The consequence of this is that R4 has only two large partitions being processed by only two worker threads, even though the query engine may have more available central processing units (CPUs) and worker threads to handle this work.

SUMMARY OF THE INVENTION

Principles of the present invention provide techniques for partitioning a query. An exemplary method (which may be computer-implemented) for partitioning a query, according to one aspect of the invention, can include steps of establishing one or more criterion for partitioning a query, wherein the query comprises one or more tables, materializing a first of the one or more tables, partitioning the first of the one or more tables until the one or more criterion have been satisfied, and partitioning and joining a remainder of the one or more tables of the query.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Principles of the present invention include adaptive and robust intra-query parallelism partitioning for multi-join queries. The techniques described herein ensure a balanced and sufficient working set partitioning to utilize all available worker threads to achieve close to optimal query response time in the presence of skews in data and/or correlation. In a parallel query execution mode, instead of joining all relations in a pipeline mode, the query engine, in one or more embodiments of the invention, dynamically materializes a number of leading relations from the first one until a sufficient number of evenly distributed partitions can be achieved. The materialized leading relations form a leading composite.

Also, one or more embodiments of the present invention ensure that the leading composite provides enough distinct, finer-grained, even partitions for fan-out subsequent join operations. A fine-grain partitioning decision can be made at a query execution time based on the processing of a materialized result of the leading composite. By ensuring a fine-grain intra-query parallelism partitioning, a shorter response time for a parallel query can be achieved.

Additionally, one or more embodiments of the invention also include properly sized working set partitioning to utilize all available worker threads (for example, advantageous for multi-core systems), as well as a balanced partitioning across sub-tasks. The techniques described herein can also include tolerance for a skew in data, and helping utilize many CPU cores as well as assisting processors.

Figure 1:
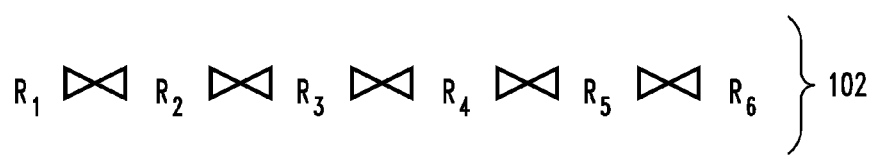
FIG. 1 is a diagram illustrating an exemplary multi-join, according to an embodiment of the present invention.

Instead of using fixed relations for partitioning, such as R1 (as depicted in FIG. 1), and making the decision at query compilation time based on statistics and estimated filtering, one or more embodiments of the invention materialize it to validate the parallel partition that R1 can provide using available ways of partitioning such as records number, (composite) key range, etc. If it does not provide sufficient fine granularity partitions for (relatively) even distribution of the parallel work, then one can join it with R2 and materialize the result. Further, in one or more embodiments of the present invention, one can continue the validation and materialization until sufficient fine-grain parallel partition can be created for a subsequent join.

As noted herein, FIG. 1 is a diagram illustrating an exemplary multi-join 102, according to an embodiment of the present invention. By way of example, if R4 in FIG. 1 is significantly larger than all preceding relations and partitioning only on R1 could not generate sufficient granular even partitions for parallel processing, one or more embodiments of the invention would possibly materialize all three preceding relations and increase the probability of R4 being processed evenly with multiple parallel tasks.

Figure 2:
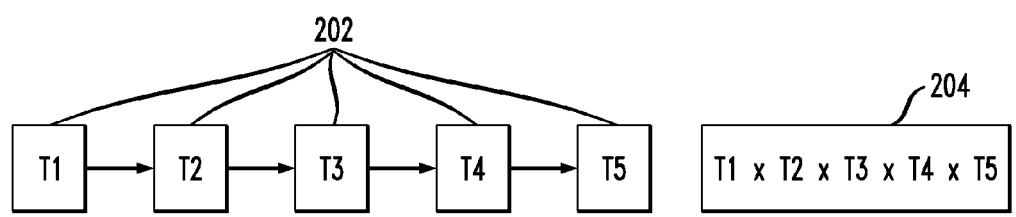
FIG. 2 is a diagram illustrating an exemplary multi-join, according to an embodiment of the present invention.

Also, FIG. 2 is a diagram illustrating an exemplary multi-join, according to an embodiment of the present invention. By way of illustration, FIG. 2 depicts a multi-join with five tables 202 and a partitioned working set 204.

Figure 3:
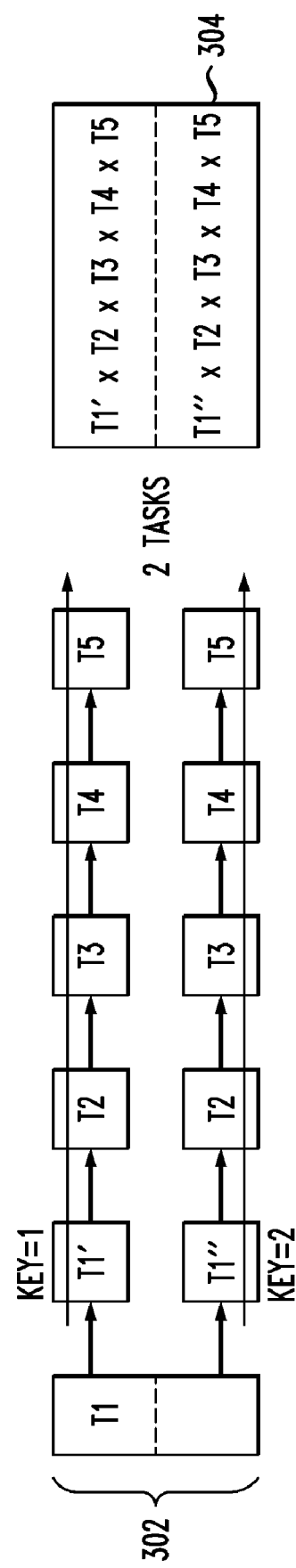
FIG. 3 is a diagram illustrating an existing approach for partitioning.

FIG. 3 is a diagram illustrating an existing approach for partitioning (static). By way of illustration, FIG. 3 depicts a multi-join 302 and partitioned working sets 304. The decision of how, when and/or where to partition in the series of query operations is made at query compilation and/or optimization time, which is before query execution. The decision may be based, for example, on previously gathered query object statistics, estimated filtering from query predicates and available system resources. Decisions, such as which tables are used for partitioning and how many partitions are generated, remain unchanged during the course of query execution.

Figure 4:
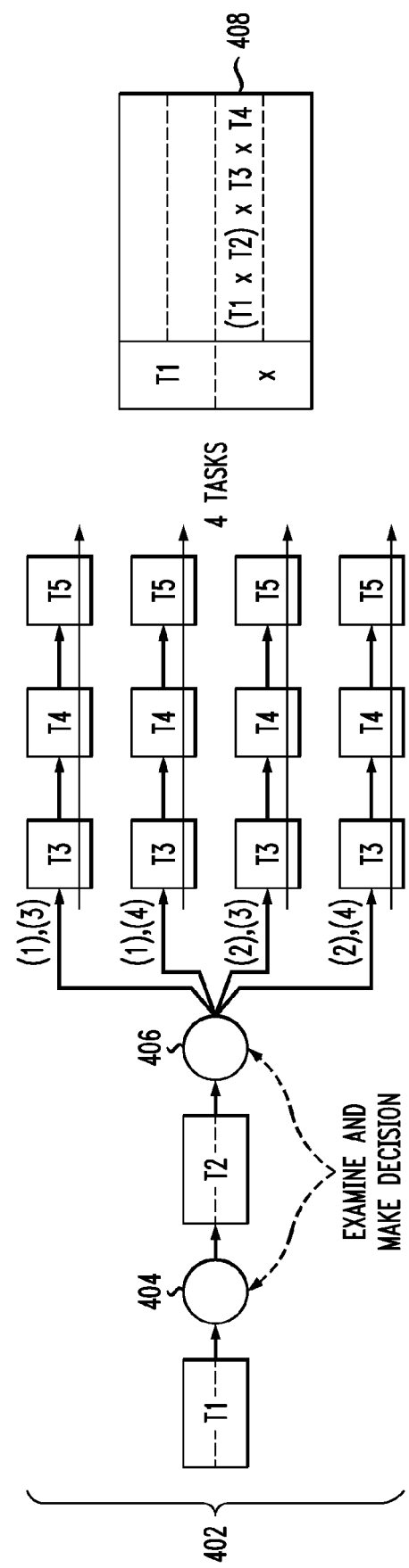
FIG. 4 is a diagram illustrating dynamic partitioning, according to an embodiment of the present invention.

FIG. 4 is a diagram illustrating dynamic partitioning, according to an embodiment of the present invention. By way of illustration, FIG. 4 depicts a multi-join 402 and partitioned working sets 408. Also, during the execution of a multi-join, one can, at step 404, dynamically determine the partitioning point, and, at step 406, perform the partitioning after examining (and joining) the first one or more tables' materialized copies until enough number of balanced working sets can be created to fully utilize available resources and getting the optimal performance for the rest of query processing.

Figure 5:
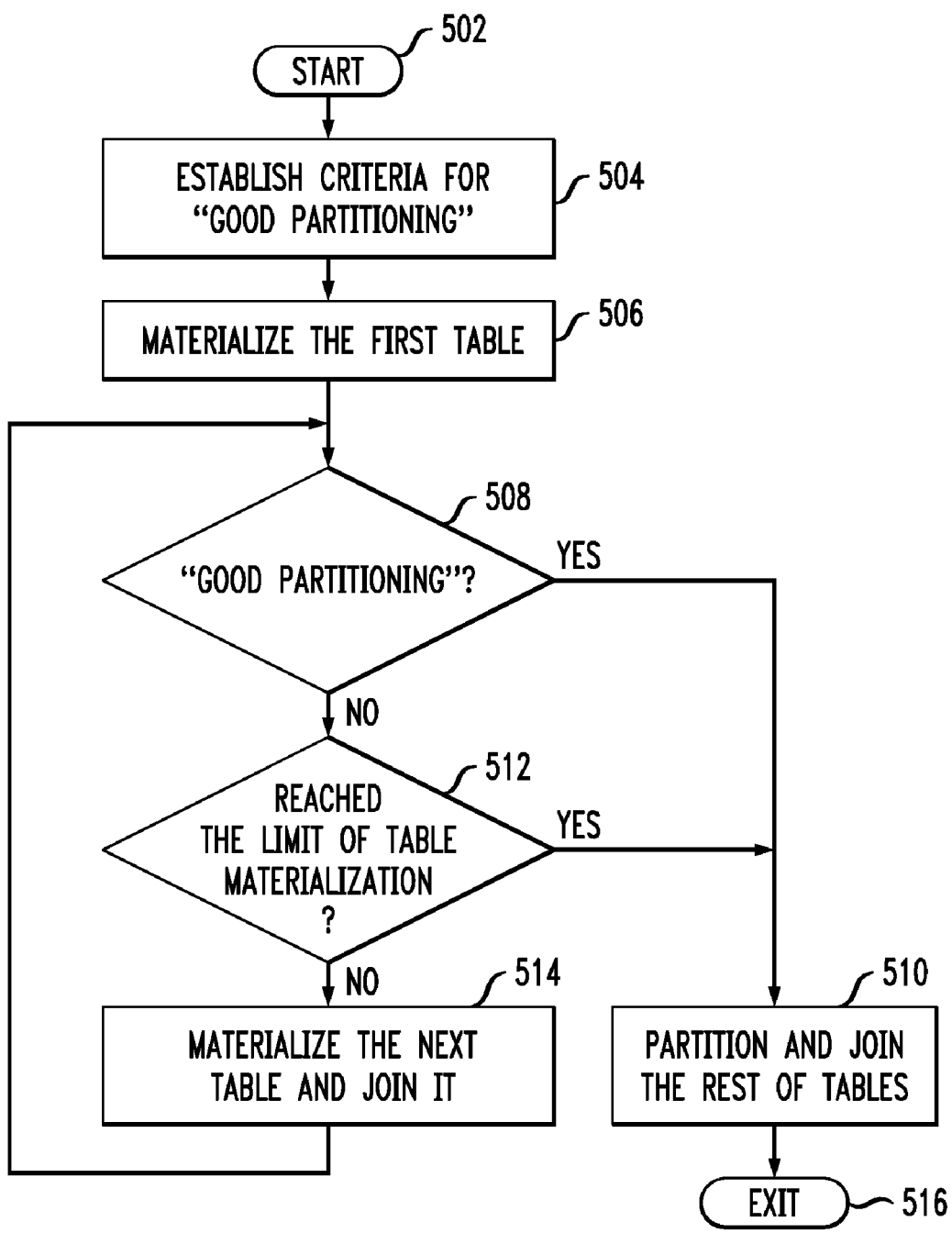
FIG. 5 is a flow diagram illustrating dynamic partitioning, according to an embodiment of the present invention.

FIG. 5 is a flow diagram illustrating dynamic partitioning, according to an embodiment of the present invention. By way of illustration, FIG. 5 depicts the following steps. Step 502 includes starting the technique. Step 504 includes establishing criteria for good partitioning. A good partitioning generates sufficiently large and evenly distributed subsets of data. A good partitioning is a pre-determined criterion that balances tasks to best utilize available resources while maintaining an even distribution of work. Step 506 includes materializing the first table. Step 508 includes determining whether or not there has been good partitioning. If the answer to the question in step 508 is yes, then one proceeds to step 510 which includes partitioning and joining the rest of the tables. If the answer to the question in step 508 is no, then one proceeds to step 512 which includes determining whether one has reached the limit of table materialization.

If the answer to the question in step 512 is yes, then one proceeds to step 510. If the answer to the question in step 512 is no, then one proceeds to step 514, which includes materializing the next table and joining it. Additionally, step 516 includes exiting the technique.

Figure 6:
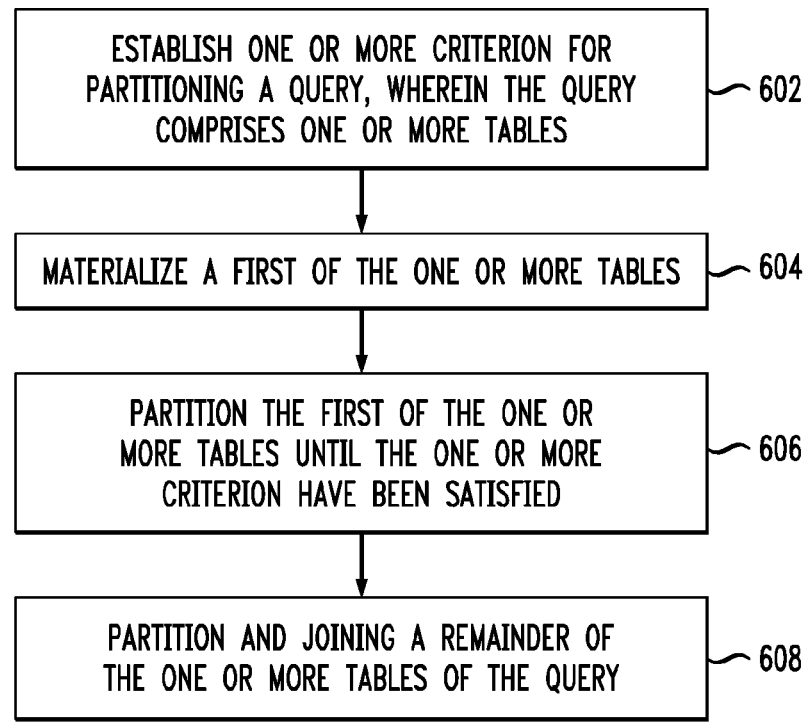
FIG. 6 is a flow diagram illustrating techniques for partitioning a query, according to an embodiment of the present invention.

FIG. 6 is a flow diagram illustrating techniques for partitioning a query, according to an embodiment of the present invention. Step 602 includes establishing one or more criterion for partitioning a query (for example, at query optimization time), wherein the query comprises one or more tables. The criteria for partitioning a query can include, for example, a limit of number of tables that can be materialized to validate parallel partitioning, a minimum number of available partitions (using available techniques of partitioning such as key, page, record, etc.) that is required for considering a partitioning granular and for subsequent parallel query processing at each step of relation join and materialization, and/or a criterion of even parallelism partitioning at each step of relation join and materialization.

Step 604 includes materializing a first of the one or more tables. Materializing a table can include, for example, materializing the first table (referred to herein, as an example, as R1) using a query parallelism mechanism. One can call the result, for purposes of illustration, Ri. Step 606 includes partitioning the first of the one or more tables until the one or more criterion have been satisfied. Step 608 includes partitioning and joining a remainder of the one or more tables of the query (with the first of the one or more tables). Partitioning and joining a remainder of the tables can include, for example, partitioning and joining the tables of the query in parallel mode.

Additionally, the techniques depicted in FIG. 6 can also include checking the materialized table (Ri) to determine if the criteria have been satisfied. One can, for example, aggregate all of the parts of the materialized table (Ri) and re-partition it granularly for further parallel query processing if a current parallel partitioning on the materialized table (Ri) does not provide even partition but its real-time materialized result can provide one or more sufficient even partitions. Further, one can, for example, partition the materialized table (Ri) evenly into as many degrees as possible if a real-time discovered key range and/or a page range on the materialized table (Ri) does not provide one or more sufficient distinct values for re-partitioning.

Also, in one or more embodiments of the invention, if the number of materialized tables has reached a pre-determined limit, one can proceed to partitioning and joining the remainder of the tables of the query. Additionally, if the current parallel partitioning on Ri provides even and sufficient fine partitioning (that is, meets pre-determined criteria), one can proceed to partitioning and joining the remainder of the tables of the query. The techniques described herein can also include joining Ri with the next table in the join sequence using a query parallelism mechanism and materializing the result.

One or more embodiments of the invention can also include, for example, executing a multi-table join query (multi-join query) using several parallel tasks including, for example, a predefined sequence of table joins, and an indicator that includes one or more predefined conditions. One or more embodiments of the invention can also include, by way of example, techniques to generate a composition from two tables, or a table with a previously generated said composition, inspection techniques to check if a table or the composition meet said conditions in the indicator, techniques to generate a the composition with the next table in the sequence if the indicator is not met by the inspection method, techniques to break the composition into even sub-compositions if the indicator is met, as well as techniques of taking said sub-compositions and joining them individually with the rest of the tables in the sequence.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 7:
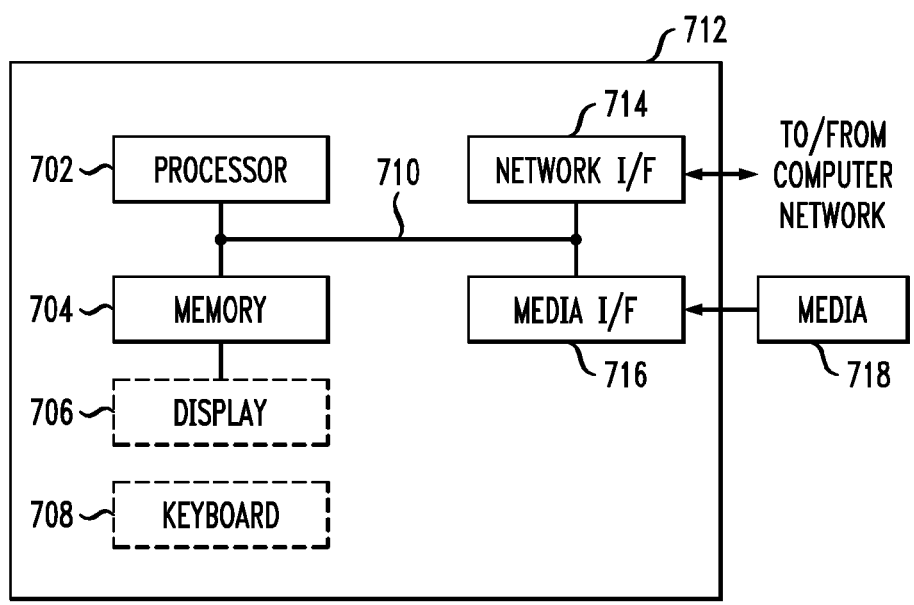
FIG. 7 is a system diagram of an exemplary computer system on which at least one embodiment of the present invention can be implemented.

At present, it is believed that the preferred implementation will make substantial use of software running on a general-purpose computer or workstation. With reference to FIG. 7, such an implementation might employ, for example, a processor 702, a memory 704, and an input and/or output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 702, memory 704, and input and/or output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 718) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 704), magnetic tape, a removable computer diskette (for example, media 718), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 702 coupled directly or indirectly to memory elements 704 through a system bus 710. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, a shorter response time for a parallel query.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for partitioning a query, comprising the steps of:
   establishing one or more criterion for partitioning a query, wherein the query comprises one or more tables, and wherein establishing one or more criterion for partitioning a query is carried out by a component executing on a hardware processor;
   materializing a first of the one or more tables, wherein materializing a first of the one or more tables is carried out by a component executing on a hardware processor;
   partitioning the first of the one or more tables until the one or more criterion have been satisfied, wherein partitioning the first of the one or more tables is carried out by a component executing on a hardware processor;
   partitioning and joining a remainder of the one or more tables of the query, wherein partitioning and joining a remainder of the one or more tables is carried out by a component executing on a hardware processor; and
   aggregating all one or more parts of the materialized table and re-partitioning it granularly for further parallel query processing if a current parallel partitioning on the materialized table does not provide even partition but its real-time materialized result can provide one or more sufficient even partitions, wherein aggregating all one or more parts of the materialized table and re-partitioning it granularly for further parallel query processing is carried out by a component executing on a hardware processor.

2. The method of claim 1, wherein establishing one or more criterion for partitioning a query comprises establishing one or more criterion for partitioning a query at query optimization time.

3. The method of claim 1, wherein the one or more criterion for partitioning a query comprise at least one of a limit of number of tables that can be materialized to validate parallel partitioning, a minimum number of available partitions that is required for considering a partitioning granular and for subsequent parallel query processing at each step of relation join and materialization, and a criterion of even parallelism partitioning at each step of relation join and materialization.

4. The method of claim 1, wherein materializing a first of the one or more tables comprises materializing the first of the one or more tables using a query parallelism mechanism.

5. The method of claim 1, wherein partitioning and joining a remainder of the one or more tables of the query comprise partitioning and joining a remainder of the one or more tables of the query in parallel mode.

6. The method of claim 1, further comprising checking the materialized table to determine if the one or more criterion has been satisfied.

7. The method of claim 6, further comprising partitioning the materialized table evenly into as many degrees as possible if at least one of a real-time discovered key range and a page range on the materialized table does not provide one or more sufficient distinct values for re-partitioning.

8. A computer program product comprising a tangible computer readable recordable storage medium having computer readable program code for partitioning a query, said computer program product including:
   computer readable program code for establishing one or more criterion for partitioning a query, wherein the query comprises one or more tables;
   computer readable program code for materializing a first of the one or more tables;
   computer readable program code for partitioning the first of the one or more tables until the one or more criterion have been satisfied;
   computer readable program code for partitioning and joining a remainder of the one or more tables of the query; and
   computer readable program code for aggregating all one or more parts of the materialized table and re-partitioning it granularly for further parallel query processing if a current parallel partitioning on the materialized table does not provide even partition but its real-time materialized result can provide one or more sufficient even partitions.

9. The computer program product of claim 8, wherein the computer readable code for establishing one or more criterion for partitioning a query comprises computer readable program code for establishing one or more criterion for partitioning a query at query optimization time.

10. The computer program product of claim 8, wherein the one or more criterion for partitioning a query comprise at least one of a limit of number of tables that can be materialized to validate parallel partitioning, a minimum number of available partitions that is required for considering a partitioning granular and for subsequent parallel query processing at each step of relation join and materialization, and a criterion of even parallelism partitioning at each step of relation join and materialization.

11. The computer program product of claim 8, wherein the computer readable code for materializing a first of the one or more tables comprises computer readable program code for materializing the first of the one or more tables using a query parallelism mechanism.

12. The computer program product of claim 8, wherein the computer readable code for partitioning and joining a remainder of the one or more tables of the query comprises computer readable program code for partitioning and joining a remainder of the one or more tables of the query in parallel mode.

13. The computer program product of claim 8, further comprising computer readable program code for checking the materialized table to determine if the one or more criterion has been satisfied.

14. The computer program product of claim 13, further comprising computer readable program code for partitioning the materialized table evenly into as many degrees as possible if at least one of a real-time discovered key range and a page range on the materialized table does not provide one or more sufficient distinct values for re-partitioning.

15. An apparatus for partitioning a query, comprising:
   a memory; and
   at least one processor coupled to said memory and operative to:
      establish one or more criterion for partitioning a query, wherein the query comprises one or more tables;
      materialize a first of the one or more tables;
      partition the first of the one or more tables until the one or more criterion have been satisfied;
      partition and join a remainder of the one or more tables of the query; and
      aggregate all one or more parts of the materialized table and re-partition it granularly for further parallel query processing if a current parallel partitioning on the materialized table does not provide even partition but its real-time materialized result can provide one or more sufficient even partitions.

16. The apparatus of claim 15, wherein in establishing one or more criterion for partitioning a query, the at least one processor coupled to said memory is further operative to establish one or more criterion for partitioning a query at query optimization time.

17. The apparatus of claim 15, wherein the one or more criterion for partitioning a query comprise at least one of a limit of number of tables that can be materialized to validate parallel partitioning, a minimum number of available partitions that is required for considering a partitioning granular and for subsequent parallel query processing at each step of relation join and materialization, and a criterion of even parallelism partitioning at each step of relation join and materialization.

18. The apparatus of claim 15, wherein in materializing a first of the one or more tables, the at least one processor coupled to said memory is further operative to materialize the first of the one or more tables using a query parallelism mechanism.

19. The apparatus of claim 15, wherein in partitioning and joining a remainder of the one or more tables of the query, the at least one processor coupled to said memory is further operative to partition and join a remainder of the one or more tables of the query partitioning and joining a remainder of the one or more tables of the query in parallel mode.

20. The apparatus of claim 15, wherein the at least one processor coupled to said memory is further operative to check the materialized table to determine if the one or more criterion has been satisfied.

21. The apparatus of claim 20, wherein the at least one processor coupled to said memory is further operative to partition the materialized table evenly into as many degrees as possible if at least one of a real-time discovered key range and a page range on the materialized table does not provide one or more sufficient distinct values for re-partitioning.

22. An apparatus for partitioning a query, said apparatus comprising:
    means for establishing one or more criterion for partitioning a query, wherein the query comprises one or more tables;
    means for materializing a first of the one or more tables;
    means for partitioning the first of the one or more tables until the one or more criterion have been satisfied;
    means for partitioning and joining a remainder of the one or more tables of the query; and
    means for aggregating all one or more parts of the materialized table and re-partitioning it granularly for further parallel query processing if a current parallel partitioning on the materialized table does not provide even partition but its real-time materialized result can provide one or more sufficient even partitions.

* * * * *